(12) United States Patent
Maegawa et al.

(10) Patent No.: US 10,771,445 B2
(45) Date of Patent: *Sep. 8, 2020

(54) ELECTRONIC DEVICE, SERVER, ELECTRONIC DEVICE CONTROLLING METHOD, INFORMATION PROCESSING METHOD AND RECORDING MEDIUM

(71) Applicant: SONY CORPORATION, Tokyo (JP)

(72) Inventors: Hirotoshi Maegawa, Tokyo (JP); Tooru Hiraga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,142

(22) Filed: Mar. 26, 2018

(65) Prior Publication Data

US 2018/0241732 A1   Aug. 23, 2018

Related U.S. Application Data

(63) Continuation of application No. 14/895,128, filed as application No. PCT/JP2014/003920 on Jul. 24, 2014, now Pat. No. 9,961,063.

(30) Foreign Application Priority Data

Aug. 9, 2013 (JP) .................................. 2013-166683

(51) Int. Cl.
*H04L 29/06* (2006.01)
*G06F 21/44* (2013.01)
(Continued)

(52) U.S. Cl.
CPC .............. *H04L 63/08* (2013.01); *G06F 21/44* (2013.01); *G06F 21/629* (2013.01); *H04L 67/10* (2013.01);
(Continued)

(58) Field of Classification Search
CPC ................... G06F 21/44; G06F 21/629; G06F 2221/2115; G06F 2221/2101;
(Continued)

(56) References Cited

U.S. PATENT DOCUMENTS 8,595,810 B1   11/2013   Ben Ayed
8,977,567 B2   3/2015   Aabye
(Continued)

FOREIGN PATENT DOCUMENTS

CN   102474721 A   5/2012
EP   2 154 675 A1   2/2010
(Continued)

OTHER PUBLICATIONS

International Search Report dated Oct. 29, 2014 in PCT/JP14/03920 Filed Jul. 24, 2014.
(Continued)

*Primary Examiner* — Mohammad A Siddiqi
(74) *Attorney, Agent, or Firm* — Xsenus LLP

(57) ABSTRACT

An information processing device includes an interface configured to receive authentication information from an electronic device. The device also includes circuitry configured to identify an execution range of an association operation program executed by the electronic device, the execution range being indicative of an authentication of an association between the electronic device and another electronic device.

19 Claims, 11 Drawing Sheets

(51) Int. Cl.
  *H04W 12/06* (2009.01)
  *G06F 21/62* (2013.01)
  *H04W 12/00* (2009.01)
  *H04L 29/08* (2006.01)
  *H04W 12/04* (2009.01)

(52) U.S. Cl.
  CPC ......... *H04W 12/003* (2019.01); *H04W 12/06* (2013.01); *G06F 2221/2101* (2013.01); *G06F 2221/2115* (2013.01); *H04L 63/062* (2013.01); *H04W 12/04* (2013.01)

(58) Field of Classification Search
  CPC ...... H04W 12/06; H04W 12/04; H04L 63/08; H04L 67/10; H04L 63/06
  See application file for complete search history.

(56) References Cited

U.S. PATENT DOCUMENTS

| | | | |
|---|---|---|---|
| 8,977,742 B1 | 3/2015 | Tang | |
| 9,961,063 B2* | 5/2018 | Maegawa | G06F 21/44 |
| 2005/0101309 A1 | 5/2005 | Groome | |
| 2006/0033809 A1* | 2/2006 | Farley | H04M 3/428 |
| | | | 348/14.01 |
| 2006/0174302 A1 | 8/2006 | Mattern | |
| 2006/0208088 A1* | 9/2006 | Sekiguchi | G06K 7/1095 |
| | | | 235/472.02 |
| 2007/0214249 A1 | 9/2007 | Ahmed | |
| 2008/0062278 A1 | 3/2008 | Khan | |
| 2009/0042508 A1* | 2/2009 | Wakasa | G06Q 10/00 |
| | | | 455/3.06 |
| 2010/0118115 A1 | 5/2010 | Takahashi et al. | |
| 2010/0251231 A1* | 9/2010 | Coussemaeker | G06F 8/61 |
| | | | 717/176 |
| 2011/0028091 A1 | 2/2011 | Higgins et al. | |
| 2011/0088067 A1 | 4/2011 | Azuma et al. | |
| 2011/0145812 A1 | 6/2011 | Kong et al. | |
| 2011/0201309 A1 | 8/2011 | Jin | |
| 2012/0084466 A1 | 4/2012 | Brown | |
| 2012/0123738 A1* | 5/2012 | Dorr | F16N 29/00 |
| | | | 702/184 |
| 2012/0210046 A1* | 8/2012 | Ito | G06K 19/07732 |
| | | | 711/103 |
| 2012/0246288 A1 | 9/2012 | Kikuoka | |
| 2013/0144731 A1 | 6/2013 | Baldwin | |
| 2013/0171965 A1* | 7/2013 | Schrecker | H04B 5/0006 |
| | | | 455/411 |
| 2013/0268687 A1* | 10/2013 | Schrecker | H04W 12/06 |
| | | | 709/229 |
| 2013/0268758 A1* | 10/2013 | Schrecker | G06F 21/00 |
| | | | 713/168 |
| 2013/0272284 A1* | 10/2013 | Tsumagari | G08C 17/00 |
| | | | 370/338 |
| 2013/0297422 A1* | 11/2013 | Hunter | G06Q 30/0261 |
| | | | 705/14.58 |
| 2014/0013107 A1 | 1/2014 | Clair | |
| 2014/0013404 A1 | 1/2014 | Clair | |
| 2014/0282877 A1* | 9/2014 | Mahaffey | H04L 63/0853 |
| | | | 726/3 |
| 2014/0351926 A1 | 11/2014 | Mccloskey | |
| 2014/0373137 A1 | 12/2014 | Muttik | |
| 2014/0376448 A1* | 12/2014 | Kao | H04N 7/181 |
| | | | 370/315 |
| 2015/0102927 A1 | 4/2015 | Johnson | |
| 2016/0055699 A1 | 2/2016 | Vincenti | |
| 2019/0014226 A1* | 1/2019 | Osuka | H04N 1/00103 |

FOREIGN PATENT DOCUMENTS

| | | |
|---|---|---|
| EP | 2 296 372 A1 | 3/2011 |
| JP | 2004-304409 A | 10/2004 |
| JP | 2009-296033 A | 12/2009 |
| JP | 2011-211513 A | 10/2011 |
| JP | 2012-143409 A | 8/2012 |
| JP | 2013-12824 A | 1/2013 |
| JP | 2013-88901 A | 5/2013 |
| JP | 2013-111281 A | 6/2013 |
| JP | 2013-143576 A | 7/2013 |

OTHER PUBLICATIONS

European Office Action dated May 4, 2017 in Patent Application No. 14 750 809.7.
Japanese Office Action dated Apr. 4, 2017 in Patent Application No. 2013-166683 (without English Translation).
Office Action dated Feb. 11, 2018 in Chinese Patent Application No. 201480043787.8 with English Translation.
Combined Chinese Office Action and Search Report dated Feb. 11, 2018 in corresponding Patent Application No. 201480043787.8 (with English Translation), 20 pages.

* cited by examiner

ELECTRONIC DEVICE, SERVER, ELECTRONIC DEVICE CONTROLLING METHOD, INFORMATION PROCESSING METHOD AND RECORDING MEDIUM

CROSS REFERENCE TO RELATED APPLICATIONS

This application is a continuation of U.S. application Ser. No. 14/895,128, filed Dec. 1, 2015, which claims the benefit of Japanese Priority Patent Application JP 2013-166683 filed Aug. 9, 2013, the entire contents of which are incorporated herein by reference.

TECHNICAL FIELD

The present disclosure relates to an electronic device, a server, an electronic device controlling method, an information processing method and a recording medium.

BACKGROUND ART

As various types of electronic devices spread, cases in which electronic devices can operate in association with each other are increasing. Realization of such an association operation expands functionalities of the devices, and may be said to give a new added value to the devices. However, since such an association between the devices is often realized through processes within the devices according to programs incorporated in the respective devices in advance, it is difficult to trace realized association operations and executable association operations later.

In such a situation, for example, a technology for issuing a user ID to a digital camera performing an association operation with a server, and providing service and executing a billing process based on this user ID is described in Patent Literature 1.

CITATION LIST

Patent Literature

[Patent Literature 1] JP 2004-304409A

SUMMARY

Technical Problem

However, in the technology described in Patent Literature 1 described above, the server which is the one device performing the association operation manages the association operation of the digital camera using the user ID. Therefore, it is difficult for the association operation between the digital camera and another device, for example, a smartphone, to be managed using this technology. Thus, it is difficult to say that technology proposed so far for managing the association operation without limitation between specific devices is sufficient.

Therefore, an electronic device, a server, a method of controlling the electronic device, an information processing method, and a recording medium which are new and improved and are capable of managing an association operation without limitation between specific devices are proposed in this disclosure.

Solution to Problem

According to one embodiment, an information processing device is described that includes an interface configured to receive authentication information from an electronic device; and
circuitry configured to
identify an execution range of an association operation program executed by the electronic device based on the authentication information, the execution range being indicative of an authentication of an association between the electronic device and another electronic device.

According to an information processing system embodiment, the system includes
an information management device including
an interface configured to receive authentication information from an electronic device, and
circuitry configured to
identify an execution range of an association operation program executed by the electronic device based on the authentication information, the execution range being indicative of an authentication of an association between the electronic device and another electronic device; and
an information processing device configured to
receive description information regarding the electronic device and the another electronic device,
communicate with the electronic device and another electronic device and
send the association operation program to the electronic device that configures the electronic device to realize an association operation between the electronic device and the another electronic device.

According to an information processing method embodiment, the method includes
receiving via an interface authentication information from an electronic device; and
identifying with the circuitry an execution range of an association operation program executed by the electronic device based on the authentication program, the execution range being indicative of an authentication of an association between the electronic device and another electronic device.

According to a non-transitory computer readable storage device embodiment, the storage device includes instructions that when executed by a computer cause the computer to execute an information processing method, the method including
receiving via an interface authentication information from an electronic device; and
identifying with the circuitry an execution range of an association operation program executed by the electronic device based on the authentication information, the execution range being indicative of an authentication of an association between the electronic device and another electronic device.

Advantageous Effects of Invention

As described above, according to this disclosure, it is possible to manage the association operation without limitation between specific devices.

DESCRIPTION OF EMBODIMENTS

Hereinafter, preferred embodiments of this disclosure will be described in detail with reference to the accompanying drawings. Further, in the present specification and drawings, components having substantially the same functional configuration are denoted with the same reference signs and a repeated description thereof is omitted.

Further, a description will be given in the following order.
1. System configuration
 1-1 Functional configuration
 1-2 Process flow
 1-3 Variant
2. Mechanism and specific example of association operation
 2-1 Mechanism of association operation
 2-2 Specific example of association operation
3. Implementation examples
4. Hardware configuration
5. Supplement (1. System Configuration)

First, a configuration of a system according to one embodiment of this disclosure will be described with reference to FIGS. 1 and 2.

(1-1. Functional Configuration)

Figure 1:
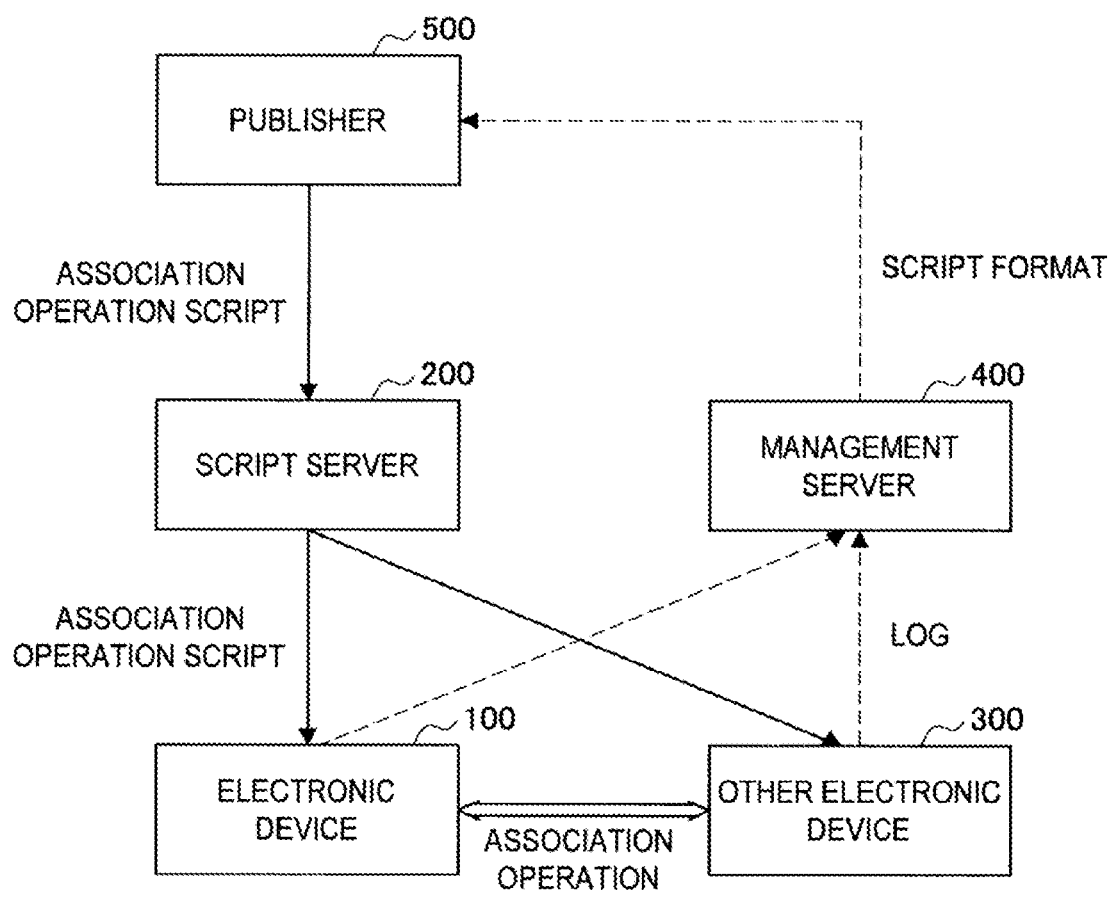
FIG. 1 is a diagram illustrating a schematic configuration of a system according to one embodiment of this disclosure.

FIG. 1 is a diagram illustrating a schematic configuration of a system according to one embodiment of this disclosure. Referring to FIG. 1, a system 10 according to one embodiment of this disclosure may include an electronic device 100, a script server 200, another electronic device 300, a management server 400, and a publisher 500.

In the illustrated example, the electronic device 100 and the other electronic device 300 may be any devices manipulated by a user and may be, for example, any devices each having an information processing functionality and a network communication functionality, such as a mobile phone (smartphone), a PC (Personal Computer), a television, a recorder, a game console, and a media player. Further, the other electronic device 300 may be, for example, an electronic device used in proximity to the electronic device 100, but may be a server different from the script server 200 and the management server 400, which is connected to the electronic device 100 over a network. The server, for example, may provide services on social media to the electronic device 100. The electronic device 100 performs an association operation with the other electronic device 300 by being controlled according to an association operation script distributed from the script server 200. The association operation script may also be similarly distributed to the other electronic device 300 or prepared in the other electronic device 300 in advance, and the other electronic device 300 may perform an association operation with the electronic device 100 by being controlled according to the association operation script. Further, a mechanism of such an association operation will be described below in detail.

Here, the association operation script distributed by the script server 200 is provided by the publisher 500. The publisher 500 is an entity which acquires a script format managed in the management server 400 and develops and publishes the association operation script according to the format. Therefore, the illustrated publisher 500 may indicate an individual or a corporation itself who acts as a publisher or a terminal device used for the individual or the corporation to receive the script format from the management server 400 and upload the association operation script to the script server 200 according to context.

In this embodiment, the association operation script may be distributed for a fee in the script server 200. In this case, the publisher 500, for example, receives a value paid by a user of the electronic device 100 and/or the other electronic device 300 which has downloaded the association operation script from the script server 200. Alternatively, the association operation script may be provided for free in the script server 200. In this case, the publisher 500 receives, for example, an advertisement charge from an advertiser of an advertisement which is distributed together with the association operation script and output in the electronic device 100 and/or the other electronic device 300.

Meanwhile, a log is transmitted from the electronic device 100 and/or the other electronic device 300 which has downloaded the association operation script and executed the association operation, to the management server 400. The log includes information on the executed association operation using the association operation script in the electronic device 100 and/or the other electronic device 300.

Here, in this embodiment, a script format provided from the management server 400 to the publisher 500 is accompanied by authentication information. The authentication information is incorporated, for example, in a fixed form part of the script format, and the authentication information can be confirmed even in the association operation script developed according to the script format. Therefore, the electronic device 100 and/or the other electronic device 300 can associate the authentication information accompanying the association operation script with the log which is transmitted to the management server 400 when the association operation has been executed. As a result, the management server 400 can recognize that the association operation has been actually executed between the electronic device 100 and the other electronic device 300, using the script format provided to the publisher 500.

Figure 2:
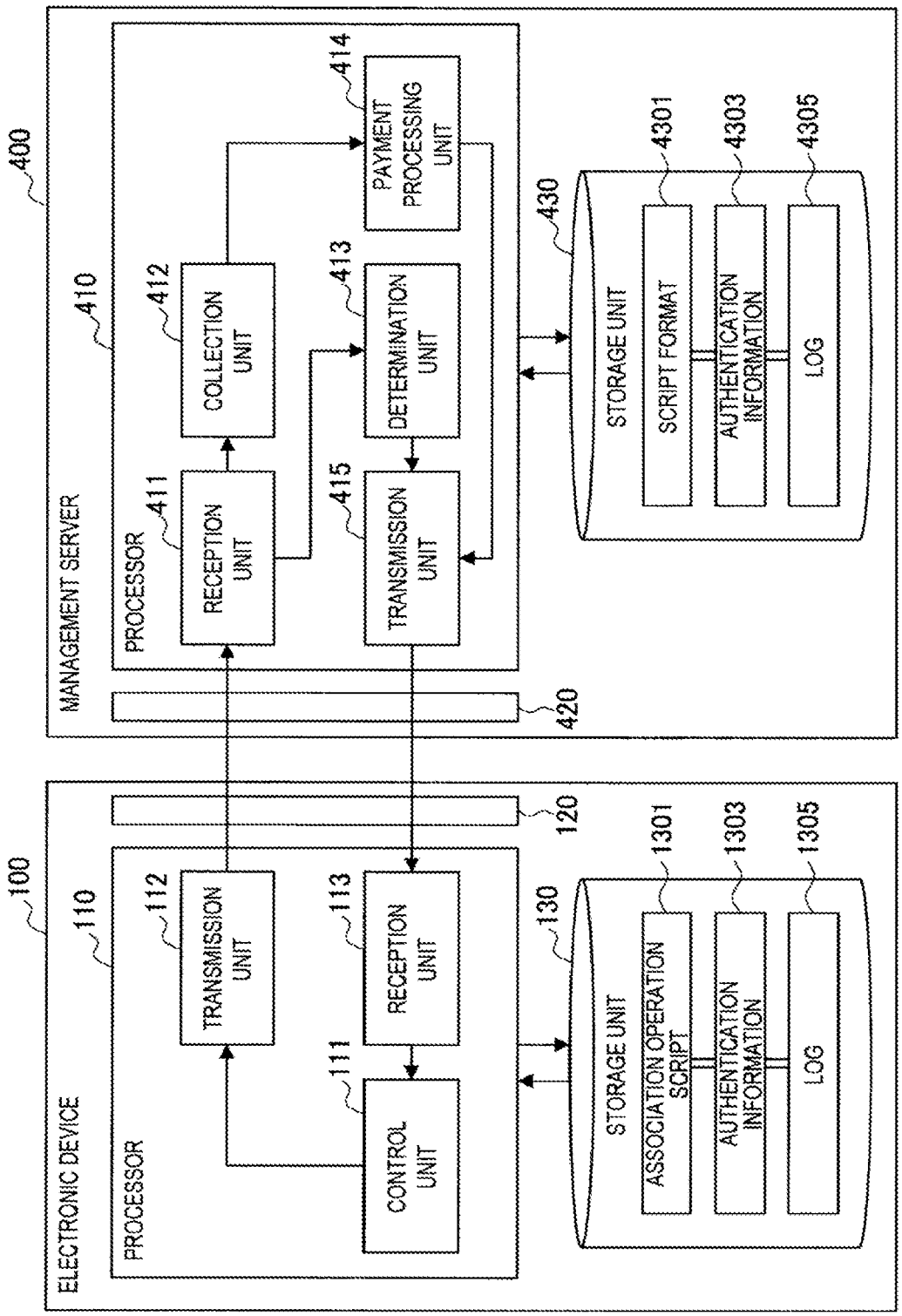
FIG. 2 is a block diagram illustrating a schematic functional configuration of an electronic device and a management server according to one embodiment of this disclosure.

FIG. 2 is a block diagram illustrating schematic functional configurations of the electronic device and the management server according to one embodiment of this disclosure. Hereinafter, configurations of the electronic device 100 and the management server 400 included in the system 10 described above will be described in greater detail with reference to FIG. 2.

(Electronic Device)

The electronic device 100 is any device manipulated by a user, and may be, for example, any device having an information processing functionality and a network communication functionality, such as a mobile phone (smartphone), a PC (Personal Computer), a television, a recorder, a game console, or a media player, as described above. The electronic device 100 includes a processor 110, a communication unit 120, and a storage unit 130. The electronic device 100 may be realized, for example, by a hardware configuration of an information processing device, which will be described below. In a hardware configuration example, the processor 110 may be realized by a CPU, a ROM, a RAM and the like. The communication unit 120 may be realized by a communication device. The storage unit 130 may be realized by, for example, a storage device and/or a removable storage medium.

The processor 110 may realize functionalities of a control unit 111, a transmission unit 112 and a reception unit 113 by operating according to a program. The processor 110 may also realize various functionalities for overall control of the electronic device 100, but the functionalities are different according to devices and are well known to a person skilled in the art. Therefore, a description of differences of the functionalities is omitted herein. Hereinafter, each of the functionalities will be further described.

The control unit 111 controls the electronic device 100 according to the association operation script provided from the script server 200 and executes an association operation with the other electronic device 300. An association operation script 1301 used by the control unit 111, for example, may be at least temporarily stored in the storage unit 130. The association operation script 1301 is accompanied by authentication information 1303, as described above.

Here, the control unit 111 may determine an execution range of the association operation script 1301 based on the authentication information 1303. More specifically, when the association operation script 1301 is not accompanied by the authentication information 1303, the control unit 111 may be set not to execute the association operation script 1301 (to determine that there is no execution range). Alternatively, the control unit 111 may be set to limit a functionality of the electronic device 100 available in the association operation when the association operation script 1301 is not accompanied by the authentication information 1303 in executing the association operation script 1301. In this case, the association operation script 1301 includes a first part in which permission based on the authentication information 1303 is necessary for execution, and a second part in which the permission based on the authentication information is not necessary for execution, and the control unit 111 may execute the second part regardless of the authentication information 1303. Further, it may be determined whether the association operation script 1301 is accompanied by the authentication information 1303 (whether the accompanied authentication information 1303 is correct), for example, based on information stored in the storage unit 130 in advance or based on information obtained through inquiry to the management server 400 via the transmission unit 112, the reception unit 113 and the communication unit 120.

Further, the control unit 111 may inquire the execution range of the association operation script 1301 of the management server 400 via the transmission unit 112. In this case, a request including the authentication information 1303 is transmitted from the transmission unit 112 to the management server 400. Information indicating the execution range of the association operation script 1301 may be included in a response produced by the management server 400 in response to the request and received by the reception unit 113. The execution range may be set to full or nothing or the execution range may be set so that only some operations are restricted. The control unit 111 executes the association operation script 1301 within the execution range indicated by the information included in the response. Accordingly, the execution range of the association operation script 1301 in the electronic device 100 can be dynamically controlled from the management server 400.

Further, when the control unit 111 has executed the association operation using the association operation script 1301, the control unit 111 may generate a log 1305 related to the association operation and at least temporarily store the log in the storage unit 130. The log 1305 is associated with the authentication information 1303 accompanying the association operation script 1301. Further, information indicating the other electronic device 300 which is an association partner or information transmitted or received through the association operation may be included in the log 1305 in addition to information (e.g., time, a number of times, or duration) indicating that the association operation has been executed. The log 1305 at least temporarily stored in the storage unit 130 may be transmitted to the management server 400 by the transmission unit 112 via the communication unit 120.

The transmission unit 112 may transmit the request including the authentication information 1303 to the management server 400, as described above. In this case, the reception unit 113 receives, from the management server 400, the response including the information indicating the execution range of the association operation script 1301, which is generated by the management server 400 in response to the request. Further, the transmission unit 112 may transmit the log 1305 related to the association operation to the management server 400. In this case, the reception unit 113 may receive payment information which has been generated by the management server 400 based on the transmitted log.

Further, the transmission unit 112 may transmit device identification information of the electronic device 100 to the script server 200 over the network. In this case, the reception unit 113 may receive the association operation script 1301 acquired in the script server 200 based on the transmitted device identification information, together with the authentication information 1303. As described above, the association operation script 1301 is used for the association operation between the electronic device 100 and the other electronic device 300. Device identification information of the other electronic device 300 may be detected in the electronic device 100 and then transmitted from the transmission unit 112 or may be detected in the script server 200.

Here, in this embodiment, a signature given by a manager of the management server 400 may be included in the authentication information 1303 accompanying the association operation script 1301. With this signature, for example, falsification of the authentication information 1303 stored in the storage unit 130 in the electronic device 100 or falsification of the authentication information 1303 accumulated in the script server 200 or the like before the authentication information 1303 is distributed to the electronic device 100 can be prevented.

(Management Server)

The management server 400 is a server on the network, and provides services to one or a plurality of electronic devices 100. The management server 400 includes a processor 410, a communication unit 420, and a storage unit 430. The functionality of the management server 400 may be realized by, for example, a single server device connected to the network. Alternatively, the functionality of the management server 400 may be realized in such a manner to be distributed to a plurality of server devices. In this case, the plurality of server devices cooperate over the network. The server device may be realized by, for example, a hardware configuration of the information processing device which will be described below. In a hardware configuration example, the processor 410 may be realized by a CPU, a ROM, a RAM and the like. The communication unit 420 may be realized by a communication device. The storage unit 430 may be realized by, for example, a storage device and/or a removable storage medium.

The processor 410 can realize functionalities of a reception unit 411, a collection unit 412, a determination unit 413, a payment processing unit 414, and a transmission unit 415 by operating according to a program. The processor 410 may realize various other functionalities for overall control of the management server 400, but these functionalities are well known to a person skilled in the art. Therefore, a description of the functionalities is omitted herein. Hereinafter, each function described above will be further described.

Further, here, a script format 4301, authentication information 4303 and a log 4305 are stored in such a manner to be associated with each other in the storage unit 430 of the management server 400. The script format is a format provided from the management server 400 to the publisher 500, which develops an association operation script according to the script format 4301, as described above. The developed association operation script is accompanied by the authentication information 4303 which is in a form that can be confirmed. Therefore, when the electronic device 100 executes the association operation according to the association operation script 1301, the electronic device 100 may acquire the authentication information 1303 accompanying the association operation script 1301, and transmit the authentication information 1303 to the management server 400 in advance to inquire the execution range of the association operation script 1301 or transmit the authentication information 1303 in such a manner to be associated with the log of the association operation to the management server 400. In this case, the management server 400 may compare the authentication information 4303 stored in the storage unit 430 with the transmitted authentication information and identify which script format 4301 is used to develop the association operation script used when the association operation is executed. In other words, in this embodiment, the script format 4301 stored in the storage unit 430 functions as information indicating an association between the association operation script and the authentication information.

The reception unit 411 receives, from the electronic device 100, the log related to the association operation executed according to the association operation script by the electronic device 100, together with the authentication information accompanying the association operation script. The received log may be provided to the collection unit 412. Further, when the control unit 111 of the electronic device 100 inquires of the management server 400 about the execution range of the association operation script 1301 via the transmission unit 112, the reception unit 411 receives the request transmitted from the transmission unit 112. The authentication information 1303 accompanying the association operation script 1301 is included in the request. The received request may be provided to the determination unit 413.

The collection unit 412 executes collection for the log received by the reception unit 411 based on the authentication information received together with the log. Upon collection, the collection unit 412 references the script format 4301 and the authentication information 4303 associated with the script format 4301, which are stored in the storage unit 430. The collection unit 412 may store a log, as the log 4305, in such a manner to be associated with the script format 4301 through the authentication information 4303 in the storage unit 430. For example, even when the association operation scripts 1301 used in the electronic device 100 are different, the authentication information 1303 accompanying the association operation scripts 1301 may be common if the association operation scripts 1301 have been developed according to the same script format 4301 by the publisher 500.

Accordingly, the collection unit 412, for example, may collect logs in units of script formats 4301 rather than units of individual association operation scripts. On the other hand, the authentication information 4303 associated with the script format 4301 may be determined in consideration of the unit of collection in the collection unit 412. For example, if the collection unit 412 collects the logs for each publisher 500 which has developed and published the association operation script, the collection unit 412 may cause authentication information 4303 different among the publishers 500 of a provision destination to be accompanied even when the script format 4301 is common.

The determination unit 413 determines the execution range of the association operation script 1301 in the electronic device 100 based on the authentication information received by the reception unit 411. For example, the determination unit 413 may determine that the execution of the association operation script 1301 is possible (the entire association operation script 1301 is executable) in the electronic device 100 when the received authentication information matches the authentication information 4303 stored in the storage unit 430. Further, the execution range of the association operation script 1301 may be registered in such a manner to be associated with the authentication information 4303 in the storage unit 430. For example, when the authentication information 4303 in which the association operation script 1301 has been registered as being executable in the past has been invalidated due to the publisher 500 and the user of the electronic device 100, the authentication information 4303 may be subsequently registered in the storage unit 430 to indicate that the execution of the association operation script 1301 is not permitted (there is no execution range). In this case, the determination unit 413 determines that the execution of the association operation script 1301 in the electronic device 100 is not permitted (there is no execution range) based on the information registered in the storage unit 430, and notifies the electronic device 100 of the fact via the transmission unit 415. Further, the determination unit 413 may transmit an additional script for invalidating the association operation script 1301 stored in the storage unit 130 of the electronic device 100 to the electronic device 100 via the transmission unit 415. Further, such an additional script may be distributed from the management server 400 to the electronic device 100 all at once not only when the reception unit 411 has received the inquiry of the execution range of the association operation script 1301 from the electronic device 100 but also, for example, when the registration of the authentication information 4303 in the storage unit 430 has been changed.

The payment processing unit 414 generates payment information based on the log 4305 collected by the collection unit 412. For example, the payment information may indicate charging to the user of the electronic device 100 according to an execution history of the association operation indicated by the log 4305. In this case, for example, the association operation script 1301 used in the electronic device 100 may be provided for free from the publisher 500 via the script server 200. Charging is performed from the management server 400 to the user of the electronic device 100 by the user of the electronic device 100 executing the association operation (e.g., a predetermined number of times or more), and a part of the value paid from the user to the manager of the management server 400 according to this charging may be distributed to the publisher 500. Alternatively, the payment information may indicate charging to the publisher 500 according to an execution history of the association operation indicated by the log 4305. In this case, for example, the association operation script 1301 used in the electronic device 100 may be provided for a fee from the publisher 500 through the script server 200. Charging may be performed from the management server 400 to the publisher 500 by the user of the electronic device 100 executing the association operation, and a part of the value that the publisher 500 has received from the user of the electronic device 100 according to this charging may be returned to the manager of the management server 400.

The transmission unit 415 transmits various pieces of information generated in the management server 400 to the electronic device 100 or a server different from the management server 400 via the communication unit 420. The transmission unit 415, for example, may transmit a response including information indicating the execution range of the association operation script 1301 in the electronic device 100, which has been generated based on the authentication information by the determination unit 413, to the electronic device 100. Further, the transmission unit 415 may transmit an additional script for invalidating the association operation script stored in the electronic device 100, which has been generated based on the authentication information by the determination unit 413, to the electronic device 100. Further, the transmission unit 415 may transmit payment information indicating charging to the user of the electronic device 100, which has been generated by the payment processing unit 414, to a server different from the management server 400 or the electronic device 100. Here, the server which is a transmission destination of the payment information is, for example, a server of the publisher 500, a server of the manufacturer of the electronic device 100, or a server of a provider providing various services to the electronic device 100, such as an affiliate.

(1-2. Process Flow)

Figure 3:
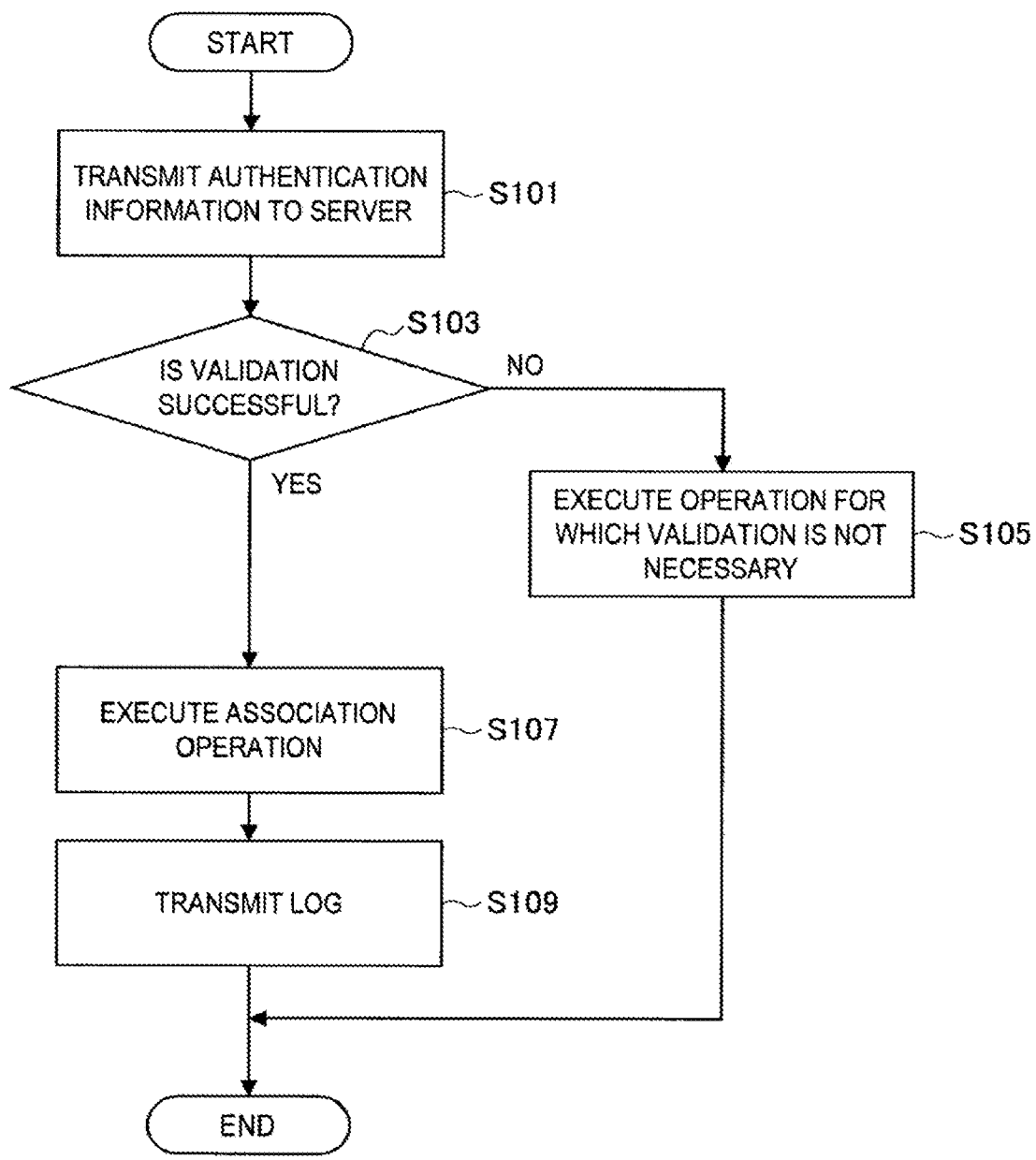
FIG. 3 is a flowchart illustrating an example of a process of the electronic device according to one embodiment of this disclosure.

FIG. 3 is a flowchart illustrating an example of a process of the electronic device according to one embodiment of this disclosure. In the example illustrated in FIG. 3, first, the control unit 111 of the electronic device 100 transmits a request including the authentication information 1303 accompanying the association operation script 1301 to be executed to the management server 400 via the transmission unit 112 (step S101). The management server 400 determines the execution range of the association operation script 1301 based on the authentication information included in the transmitted request, and transmits a determination result as a response to the electronic device 100. In the electronic device 100, the reception unit 113 receives the response including the information indicating the execution range of the association operation script 1301.

Here, the control unit 111 determines whether validation of the association operation script 1301 is successful based on the information included in the response received by the reception unit 113 (step S103). In the illustrated example, the validation of the association operation script 1301 means that execution of the association operation using the association operation script 1301 is permitted by the management server 400 and is enabled. A case in which the association operation has not been validated may be a case in which the execution of the association operation has not been permitted by the management server 400 or a case in which the association operation has been restricted.

When the validation of the association operation script 1301 is successful in step S103, the control unit 111 executes the association operation according to the association operation script 1301 (step S107). Further, after the execution of the association operation or during the execution of the association operation, the control unit 111 generates a log related to the association operation, associates the generated log 1305 with the authentication information 1303, and transmits the log to the management server 400 (step S109).

On the other hand, when the validation of the association operation script 1301 has not been successful in step S103, the control unit 111 executes an operation for which validation is not necessary (step S105). The operation for which validation is not necessary is, for example, an operation which is defined as an operation for which validation based on the authentication information 1303 is not necessary in the association operation script 1301 or the response received from the management server 400. When there is no such operation, the control unit 111 can directly end the process without executing the association operation. Further, the control unit 111 may notify a user that an executable association operation is present but it is difficult for the executable association operation to be (sufficiently) executed since authentication information is not valid.

(1-3. Variants)

In a variant of one embodiment of this disclosure described above, for example, not only the association operation script but also a software interface which realizes the association operation between the devices in cooperation with the association operation script may be accompanied by the authentication information. This software interface is referenced as a device API in an example which will be described below. The software interface, for example, is obtained by abstracting the functionalities of the electronic device 100, and each functionality is defined as a function. In this case, the control unit 111 of the electronic device 100 accesses the software interface according to the association operation script, and realizes the functionality of the electronic device 100 necessary for the association operation by calling the defined function.

In this variant, for example, the control unit 111 of the electronic device 100 may at least temporarily store the log related to the association operation in such a manner to be associated with the authentication information 1303 accompanying the association operation script 1301 and the authentication information accompanying the software interface, in the storage unit 130, and the transmission unit 112 may transmit this log to the management server 400. In this case, in the management server 400, the reception unit 411 receives the log together with the respective authentication information.

Further, in the variant described above, the transmission unit 112 of the electronic device 100 may transmit a request including the authentication information accompanying each of the association operation script 1301 and the software interface to the management server 400. In this case, in the management server 400, the reception unit 411 receives the request including the respective authentication information, and the determination unit 413 determines the execution range of the association operation script 1301 based on the respective authentication information.

As in the variant described above, as the software interface of the electronic device 100 is also accompanied by the authentication information, it is possible for the management server 400 to recognize which association operation script is used to execute the association operation and which device is used to execute the association operation. Further, a signature given by the manager of the management server 400 may also be included in the authentication information accompanying the software interface, as in the authentication information accompanying the association operation script.

(2. A Mechanism and a Specific Example of the Association Operation)

Next, a mechanism and a specific example of the association operation in one embodiment of this disclosure will be described with reference to FIGS. 4 to 8.

(2-1. Mechanism of the Association Operation)

Figure 4:
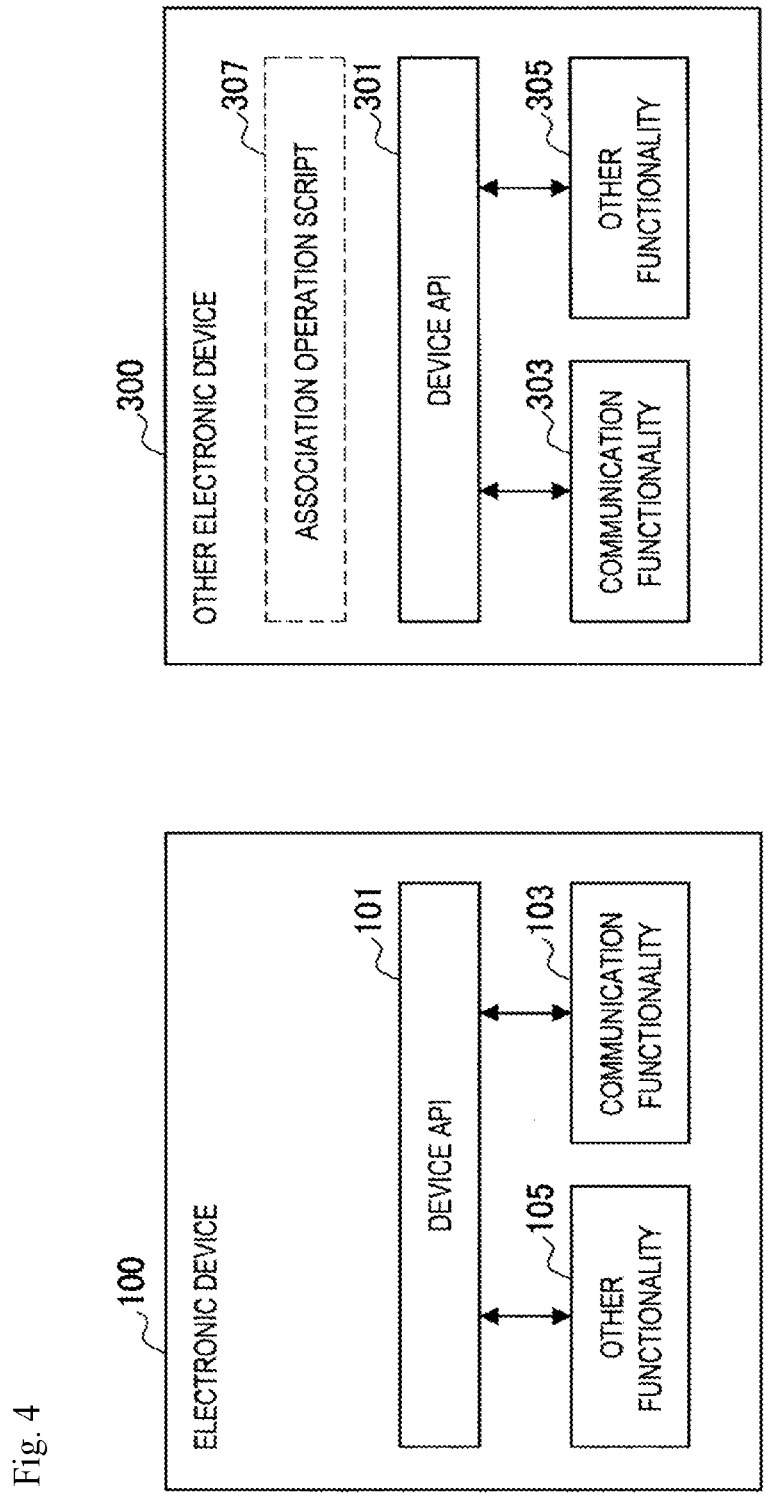
FIG. 4 is a diagram illustrating a functionality of an association operation script in one embodiment of this disclosure.
Figure 5:
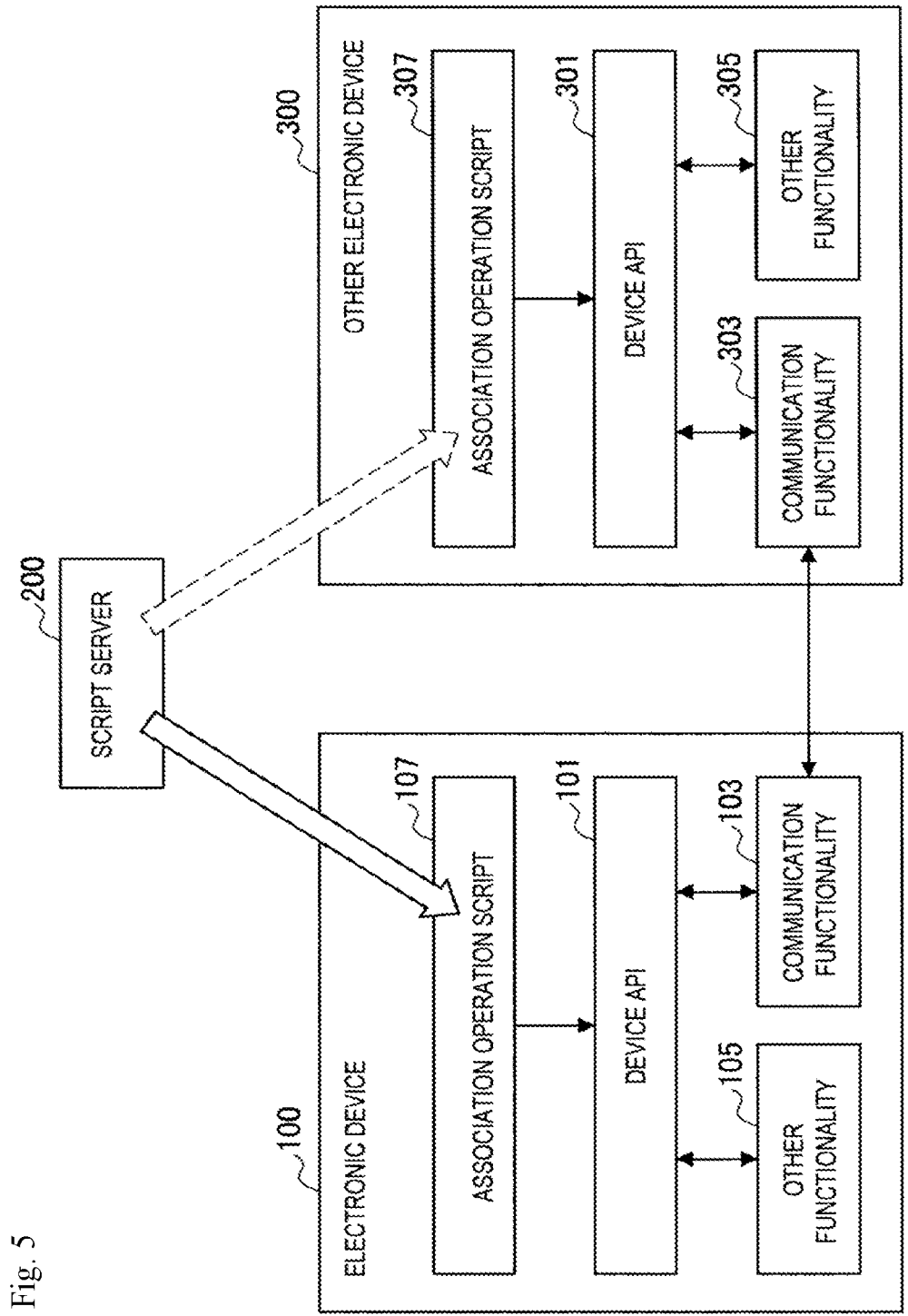
FIG. 5 is a diagram illustrating a functionality of the association operation script in one embodiment of this disclosure.

FIGS. 4 and 5 are diagrams illustrating a functionality of the association operation script in one embodiment of this disclosure. Device APIs (Application Programming Interfaces) 101 and 301, communication functionalities 103 and 303, and other functionalities 105 and 305 for the electronic device 100 and the other electronic device 300 are illustrated in FIGS. 4 and 5. While these elements of the electronic device 100 will be described by way of example hereinafter, the same applies to the other electronic device 300.

The device API 101 is an API prepared to use a functionality of the electronic device 100 and may be realized as software by the processor 110 of the electronic device 100. The communication functionality 103 and the other functionality 105 of the electronic device 100 are abstracted by the device API 101. In other words, for example, when a function defined in the device API 101 is called, the processor 110 issues a control command for controlling the processor 110 itself or hardware such as the communication unit 120, the storage unit 130 and the input/output unit 140 to realize the communication functionality 103 and the other functionality 105.

In a state illustrated in FIG. 4, there is no association operation script in at least the electronic device 100. In this state, the association operation between the electronic device 100 and the other electronic device 300 is difficult. On the other hand, in a state illustrated in FIG. 5, an association operation script 107 is distributed to the electronic device 100 by the script server 200. In the electronic device 100, the communication functionality 103 and the other functionality 105 for an association operation with the other electronic device 300 are realized by the processor 110 calling the function defined in the device API 101 according to the association operation script 107.

On the other hand, an association operation script 307 may also be distributed to the other electronic device 300 by the script server 200, as in the electronic device 100. Alternatively, the association operation script 307 may have been prepared in the other electronic device 300 in advance, as illustrated in FIG. 4. In the other electronic device 300, the communication functionality 303 and the other functionality 305 for an association operation with the electronic device 100 are realized by calling a function defined in the device API 301 according to the association operation script 307. A state in which the communication functionality 103 of the electronic device 100 and the communication functionality 303 of the other electronic device 300 are communicating with each other in the association operation is illustrated in FIG. 5.

Here, the association operation script in this embodiment will be described again. In the present specification, an association operation program described in a script format among association operation programs is referred to as an association operation script. The script format may mean a program described using a script language or an interpreter language. An example of such a language includes a markup language. Further, the association operation program is not limited to a script format and may be described in other formats (e.g., an object code or an assembly language), but when the association operation program is described in a script format, it is advantageous, for example, in that a program development period is shortened.

For example, an entity which executes an operation, a function of a used API, a parameter set in the function, a combination or an order of functions to be executed, and the like are described in the association operation script. For example, in the example illustrated in FIGS. 4 and 5, in the electronic device 100, an interpreter corresponding to the association operation script 107 is implemented in the processor 110, and a function of the device API 101 is called according to interpretation of the association operation script 107 by the interpreter, such that the communication functionality 103 and the other functionality 105 are realized. The same applies to the other electronic device 300.

Thus, in this embodiment, the functionality realized by the hardware of the electronic device is abstracted using the device API, and each functionality is realized through the device API according to a predetermined condition and/or procedure using the association operation script, such that the association operation between the devices is realized. Therefore, it is not necessary to determine conditions or procedures for all association operations at the time of manufacture of the electronic device and write the conditions or the procedures as a program, and it is possible to define the conditions or the procedures using the association operation script after manufacture of the electronic device. Therefore, it is possible to shorten a development period of the electronic device, and easily realize the association operation with a new device appearing after manufacture of the electronic device.

Further, since an association operation script can be provided after the electronic device of the association partner is concretely identified, a case in which information on a large number of association operations, including association operations which are unrealizable, is displayed and confuses the user does not occur. Further, for example, even when electronic devices of association partners are different according to a difference of products circulating in each region, association operations according to the respective regions can be selectively presented and realized without modifying a program design of the electronic devices. Further, as the association script can be updated or invalidated, for example, a posteriori management of a use right of the association operation or distribution of a time-limited, effective association operation script is possible.

(2-2. A Specific Example of the Association Operation)

Figure 6:
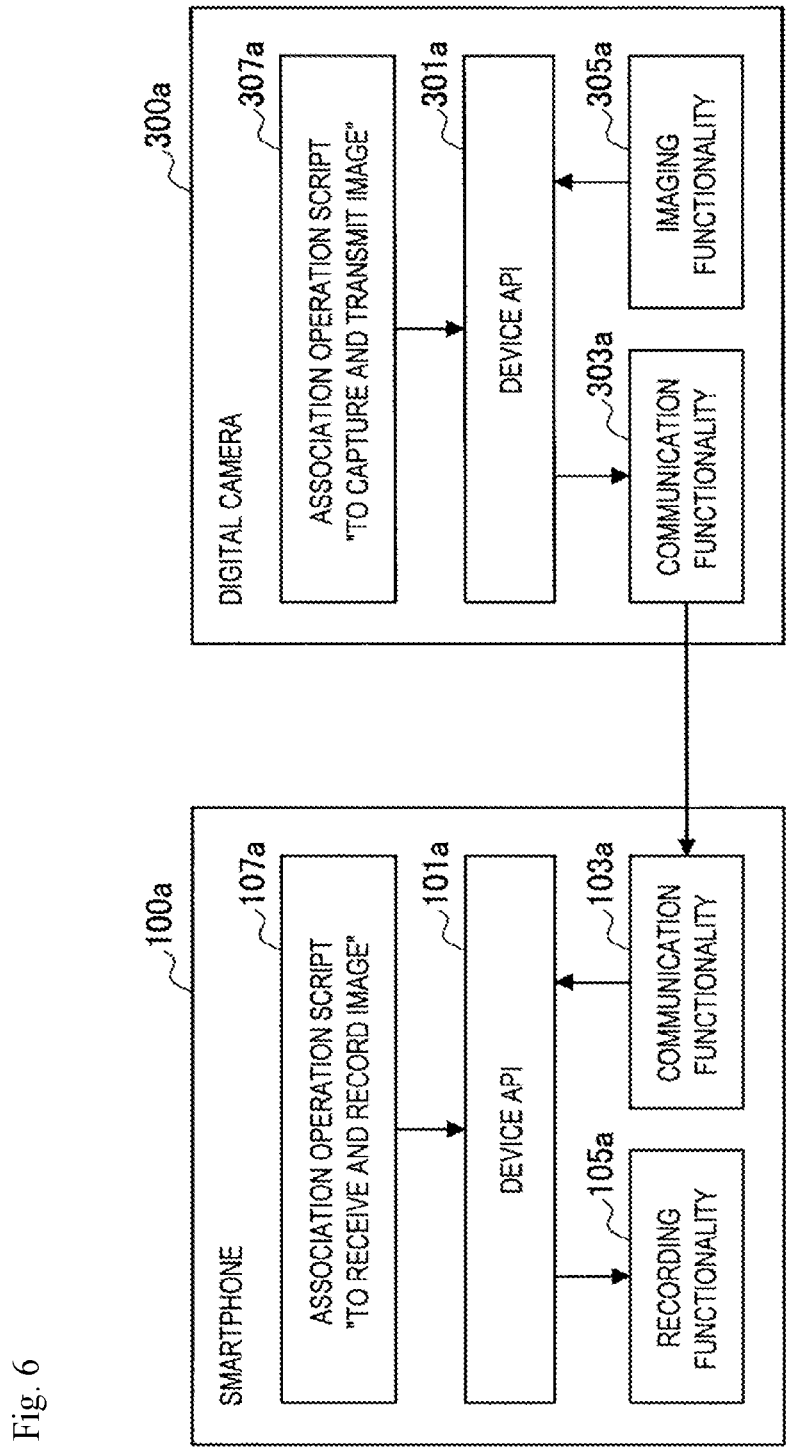
FIG. 6 is a diagram illustrating a first specific example of the association operation in one embodiment of this disclosure.

First Example: An Image Captured by a Digital Camera is Recorded by a Smartphone FIG. 6 is a diagram illustrating a first specific example of the association operation in one embodiment of this disclosure. In the example illustrated in FIG. 6, a smartphone 100a is illustrated as a specific example of the electronic device 100 and a digital camera 300a is illustrated as a specific example of the other electronic device 300.

In the illustrated example, an association operation script 107a "to receive and record an image" is provided from the script server 200 to the smartphone 100a and an association operation script 307a "to capture and transmit an image" is provided from the script server 200 to the digital camera 300a. The association operation scripts 107a and 307a are scripts for realizing an association operation between the smartphone 100a and the digital camera 300a "to transfer the image captured by the digital camera 300a to the smartphone 100a and record the image on the smartphone 100a." For example, the association operation scripts 107a and 307a may be stored to be associated with device identification information of the smartphone 100a and the digital camera 300a in the script server 200.

The association operation "to transfer the image captured by the digital camera 300a to the smartphone 100a and record the image on the smartphone 100a" may be executed, for example, when photographs are shared between friends visiting the same place or an image of the camera provided to the public (e.g., installed in a restricted area) at a sightseeing spot or an event meeting place is acquired. Therefore, the association operation scripts 107a and 307a may be distributed to the smartphone 100a and the digital camera 300a, for example, when the smartphone 100a and the digital camera 300a have been close to each other and short distance communication has been executed or when an image including a two-dimensional code indicating the digital camera 300a is captured by a camera of the smartphone 100a. More specifically, when a request including the device identification information of the digital camera 300a has been transmitted from the smartphone 100a to the script server 200, the association operation scripts 107a and 307a may be distributed from the script server 200.

Here, the script server 200 may transmit the association operation script 107a to the smartphone 100a and the association operation script 307a to the digital camera 300a. Alternatively, the script server 200 may transmit both of the association operation script 107a and the association operation script 307a to both of the smartphone 100a and the digital camera 300a, the smartphone 100a may selectively execute the association operation script 107a, and the digital camera 300a may selectively execute the association operation script 307a. In this case, the association operation script 107a and the association operation script 307a may be described, for example, in the same file or may be described in separate files.

For example, a function of capturing an image using the imaging functionality 305a and a function of transmitting image data using the communication functionality 303a are defined in the device API 301a of the digital camera 300a. In the digital camera 300a, imaging using the imaging functionality 305a is first executed and then data transmission using the communication functionality 303a is executed for the image data obtained by imaging, as a result of calling the functions according to the association operation script 307a. In this case, the smartphone 100a may be designated as a transmission destination of the image data according to the association operation script 307a.

Meanwhile, a function of receiving the image data using the communication functionality 103a and a function of recording the image data using the recording functionality 105a are defined in the device API 101a of the smartphone 100a. In the smartphone 100a, first, the reception of the image data using the communication functionality 103a is executed and then the received image data is recorded using the recording functionality 105a as a result of such functions are called according to the association operation script 107a. In this case, according to the association operation script 107a, the digital camera 300a may be designated as a transmission source of the image data.

(Second Example: Remote Photography)

Figure 7:
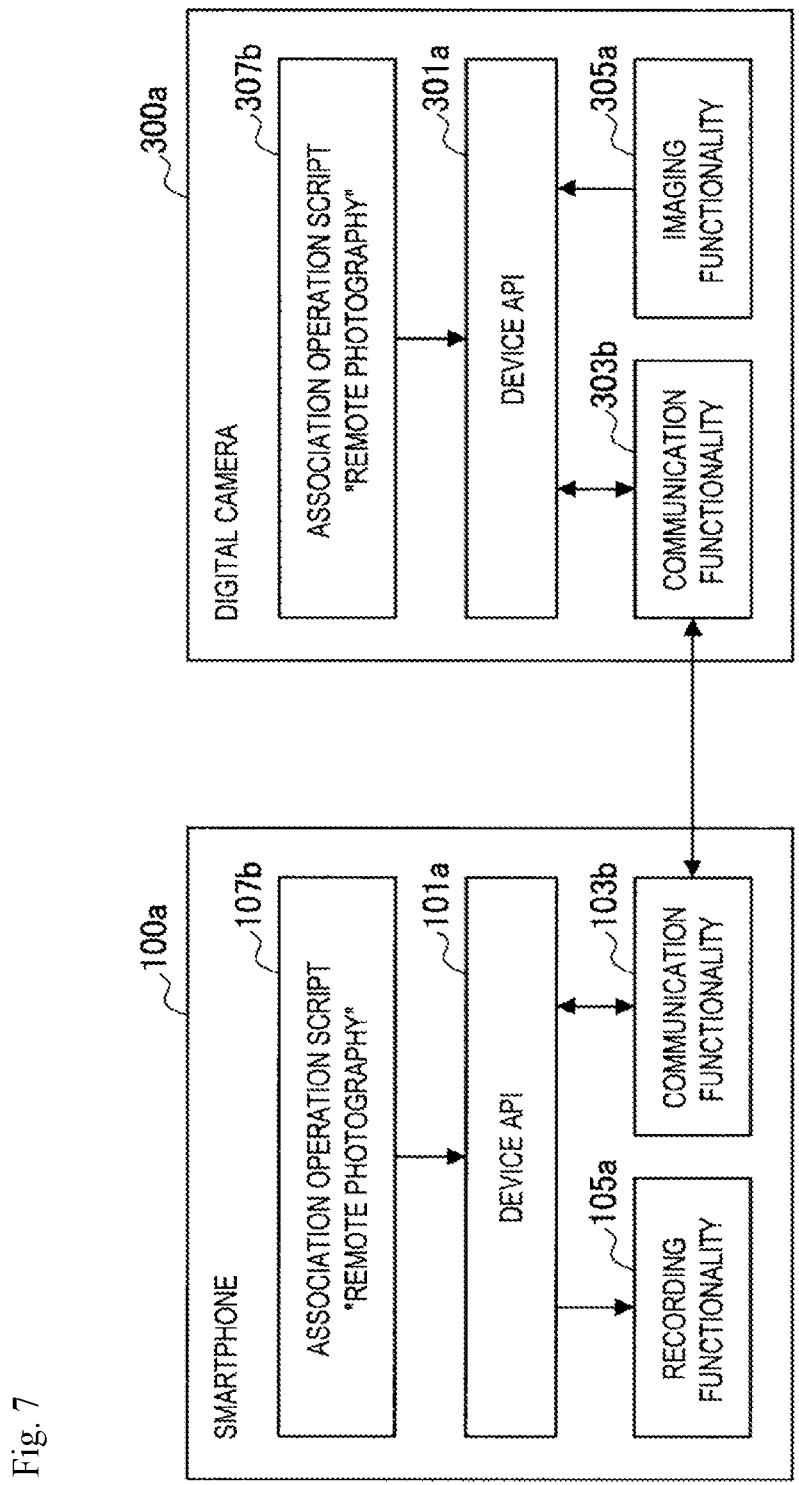
FIG. 7 is a diagram illustrating a second specific example of the association operation in one embodiment of this disclosure.

FIG. 7 is a diagram illustrating a second specific example of the association operation in one embodiment of this disclosure. In the example illustrated in FIG. 7, a smartphone 100a is illustrated as a specific example of the electronic device 100, and a digital camera 300a is illustrated as a specific example of the other electronic device 300.

In the illustrated example, an association operation script 107b of "remote photography" is provided from the script server 200 to the smartphone 100a and an association operation script 307b of "remote photography" is provided from the script server 200 to the digital camera 300a. The association operation scripts 107b and 307b are scripts for realizing an association operation between the smartphone 100a and the digital camera 300a "to remotely control the digital camera 300a from the smartphone 100a and execute the photography." The association operation scripts 107b and 307b may be stored, for example, in the script server 200 to be associated with the device identification information of the smartphone 100a and the digital camera 300a, as in the first example. A distribution form of the scripts from the script server 200 to the smartphone 100a and the digital camera 300a is the same as that in the first example described above.

The association operation "to remotely control the digital camera 300a from the smartphone 100a and execute the photography" may be executed in the same situation as in the first example described above. Therefore, the association operation scripts 107b and 307b may be distributed to the smartphone 100a and the digital camera 300a on the same condition as in the first example.

For example, a function of transmitting a control command to an imaging device using a communication functionality 103b different from the communication functionality 103a in the first example and receiving image data from the imaging device is defined in a device API 101a of the smartphone 100a. Further, a function of receiving the control command from the control device using a communication functionality 303b different from the communication functionality 303a in the first example and transmitting the image data to the control device is defined in a device API 301a of the digital camera 300a.

In the second example, first, the communication functionality 103b in the smartphone 100a is executed through the device API 101a by the association operation script 107b. In this case, as the digital camera 300a is designated as an imaging device which is a transmission destination, the control command is transmitted from the smartphone 100a to the digital camera 300a. On the other hand, the communication functionality 303b in the digital camera 300a is executed through the device API 301a by the association operation script 307b. In this case, as the smartphone 100a is designated as a control device which is a transmission source, the control command transmitted from the smartphone 100a is received.

Here, information of the function of the device API 301a of the digital camera 300a designated by the association operation script 107b may be included in the control command. Thus, in this embodiment, using information on a device API of a device of an association partner described in the association operation script, a control command according to the device of the association partner may be issued, for example, in the case of the remote control as in the example described above.

Subsequently, in the digital camera 300a, imaging using an imaging functionality 305a is executed according to the received control command, and image data obtained by the imaging is transmitted to the smartphone 100a using the communication functionality 303b. In the smartphone 100a, the image data is received from the digital camera 300a using the communication functionality 103b, and the received image data is recorded using a recording functionality 105a.

(Third Example: Recording During a Call)

Figure 8:
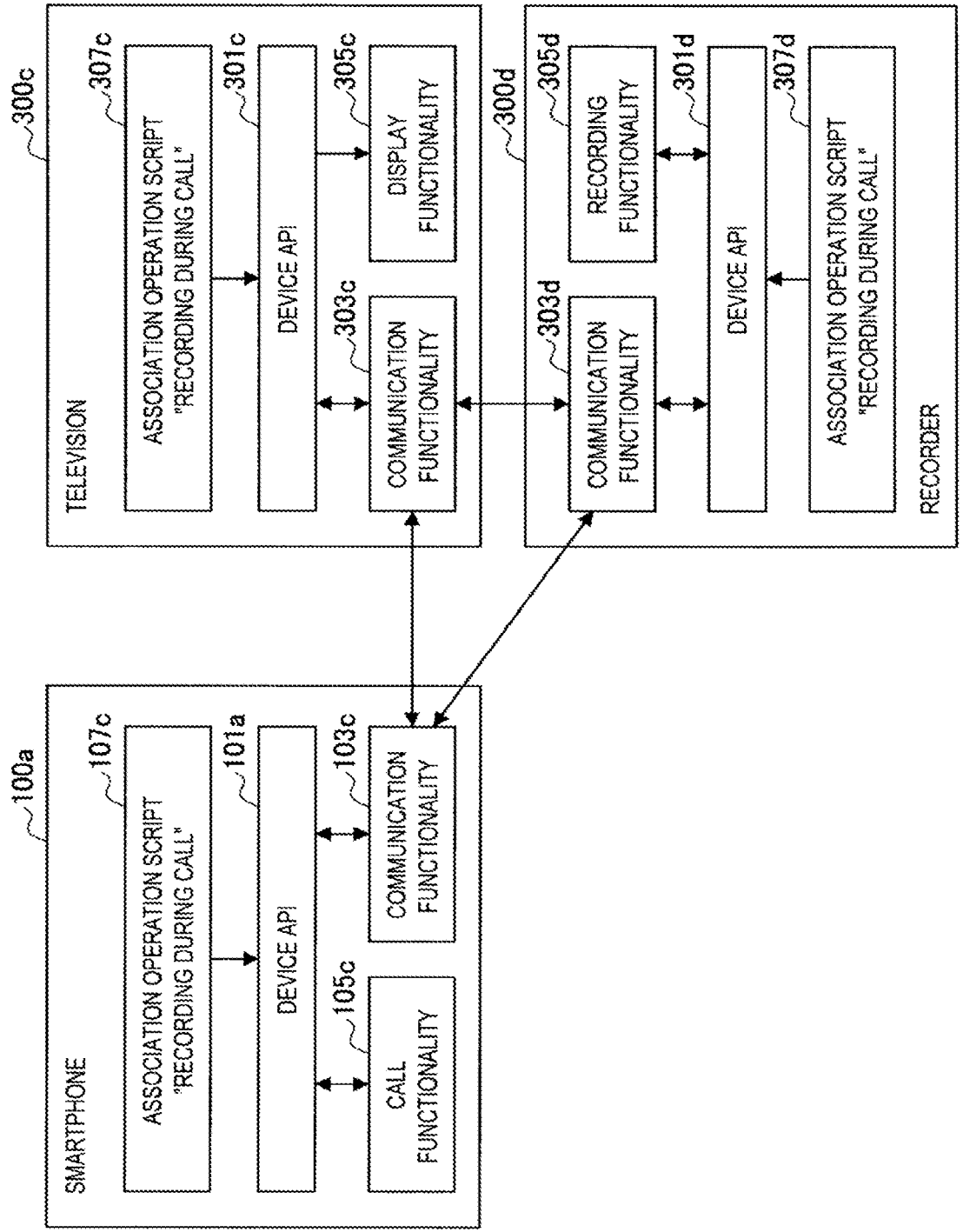
FIG. 8 is a diagram illustrating a third specific example of the association operation in one embodiment of this disclosure.

FIG. 8 is a diagram illustrating a third specific example of the association operation in one embodiment of this disclosure. In the example illustrated in FIG. 8, a smartphone 100a is illustrated as a specific example of the electronic device 100, and a television 300c and a recorder 300d are illustrated as a specific example of the other electronic devices 300.

In the illustrated example, association operation scripts 107c, 307c and 307d of "recording during a call" are provided from the script server 200 to the smartphone 100a, the television 300c and the recorder 300d, respectively. The association operation scripts 107c, 307c and 307d are scripts for realizing an association operation among the smartphone 100a, the television 300c and the recorder 300d "to record content televised by the television 300c on the recorder 300d during a call on the smartphone 100a and reproduce the content after the call." The association operation scripts 107c, 307c and 307d may be stored to be associated with device identification information of the smartphone 100a, the television 300c and the recorder 300d, for example, in the script server 200.

For example, the association operation "to record content televised by the television 300c on the recorder 300d during a call on the smartphone 100a and reproduce the content after the call" may be executed when a user of the smartphone 100a watches the television 300c at home and there is an incoming call on the smartphone 100a. For example, when the smartphone 100a, the television 300c and the recorder 300d are connected to a LAN within the same home, the association operation scripts 107c, 307c and 307d may be distributed from the script server 200 to the respective devices.

Here, since there are a large number of other association operations as association operations of the smartphone 100a and the television 300c and/or the recorder 300d, for example, when the smartphone 100a is connected to the LAN within the home, a plurality of the association operation scripts including the association operation scripts 107c, 307c and 307d may be distributed to the devices. Alternatively, association operation scripts to be distributed may be selected by a user manipulation. A timing at which the association operation is executed by each association operation script may be designated, for example, by a user manipulation or may be automatically determined in conjunction with another operation executed by each device.

In the illustrated example, when the association operation script 107c in the smartphone 100a recognizes that a call using a call functionality 105c starts through the device API 101a, the association operation script 107c starts up a communication functionality 103c through the device API 101a. Using the communication functionality 103c, the television 300c and the recorder 300d are notified that the association operation by the association operation scripts 307c and 307d starts.

In this case, the association operation script 307c in the television 300c acquires information (e.g., a channel of broadcasting waves) on content televised using a display functionality 305c through the device API 301c, and transmits the acquired information using the communication functionality 303c to the recorder 300d. Meanwhile, in the recorder 300d, the association operation script 307d receives the information transmitted from the television 300c using a communication functionality 303d through the device API 301d and starts recording of the content using a recording functionality 305d.

Then, in the smartphone 100a, the association operation script 107c recognizes that a call using the call functionality 105c ends through the device API 101a In this case, using the communication functionality 103c, the television 300c and the recorder 300d are notified that a stage of the association operation is shifted from recording to reproduction. In this case, the association operation script 307d in the recorder 300d ends the recording of the content using the recording functionality 305d (when the televising of the content does not end, recording may continue for subsequent time shift reproduction), and provides the recorded content to the television 300c using the communication functionality 303d.

Meanwhile, in the television 300c, the association operation script 307d receives the content transmitted from the recorder 300d using the communication functionality 303c, and televises the received content using the display functionality 305c. This operation of the television 300c, for example, may be an operation of switching a source of the content televised using the display functionality 305c from the broadcasting waves to HDMI (registered trademark) (High-Definition Multimedia Interface). With the association operation described above, the user can watch, on the television 300c, a part of the content missed due to televising during a call after ending the call on the smartphone 100a.

Further, in the illustrated example, the communication functionalities 303c and 303d can execute both of communication through a LAN within a home, including the smartphone 100a, and communication using the HDMI (registered trademark) between the television 300c and the recorder 300d. These communications may be implemented, for example, by separate functions in the device APIs 301c and 301d. Thus, the functionalities described in the respective described examples do not necessarily correspond to the functions defined in the device APIs. The respective functionalities, for example, may be realized by calling a plurality of functions defined in the device APIs according to a predetermined procedure.

As described above, in this embodiment, various association operations by various devices are possible. All association operations realized, for example, by storing procedures for the association operations in the respective devices in advance can be realized as association operations in the system according to this embodiment by preparing device APIs in the respective devices and distributing association operation scripts capable of using the device APIs, as shown in the example described above.

(3. Implementation Examples)

Next, implementation examples of one embodiment of this disclosure will be described with reference to FIGS. 9 and 10.

Figure 9:
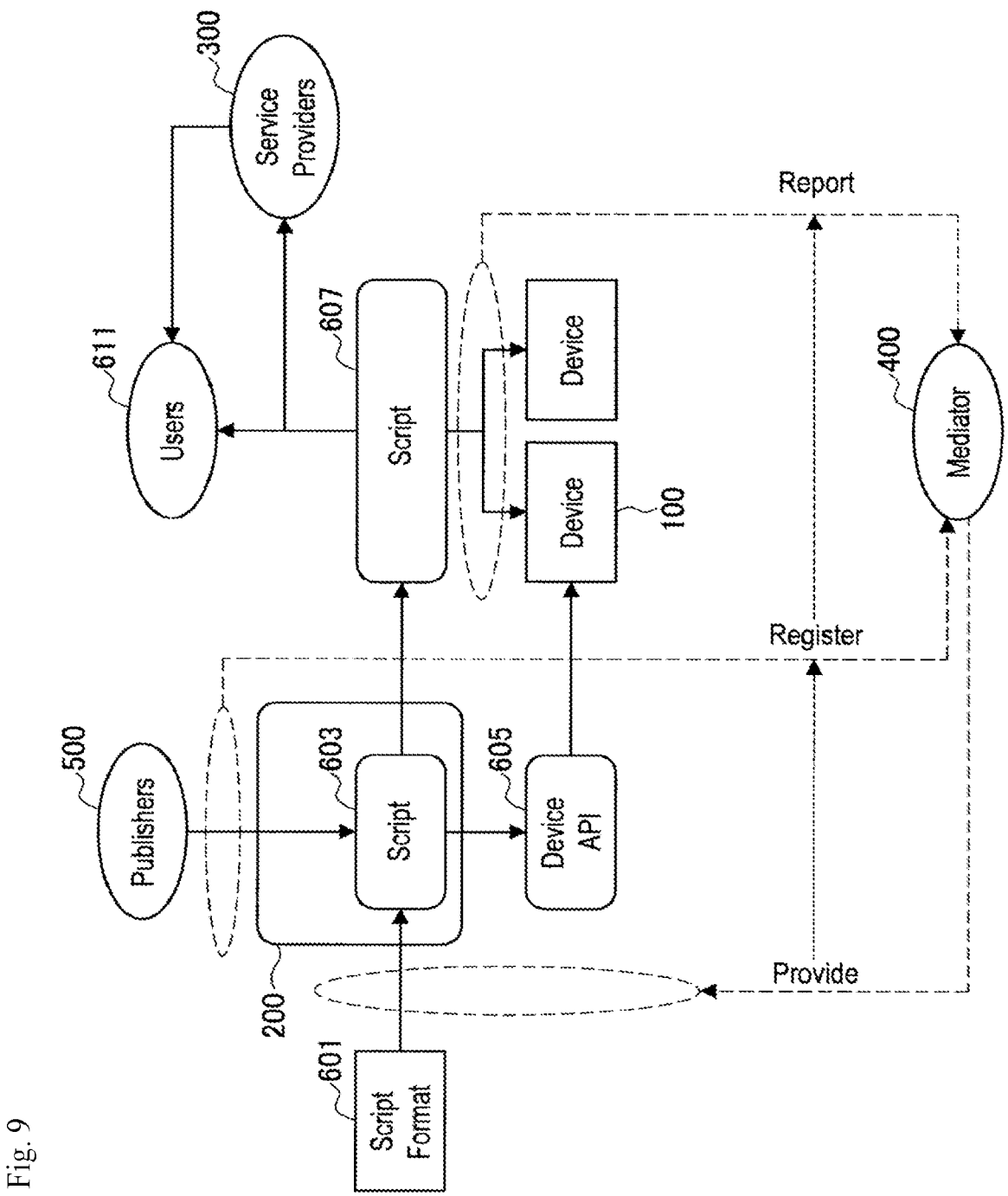
FIG. 9 is a diagram illustrating a first implementation example in one embodiment of this disclosure.

FIG. 9 is a diagram illustrating a first implementation example in one embodiment of this disclosure. A marketplace 200 illustrated in FIG. 9 corresponds to the script server 200 in the embodiment described above. Further, a mediator 400 corresponds to the management server 400 in the embodiment described above. Further, a service provider 300 corresponds to the other electronic device 300 in the embodiment described above. Thus, the other electronic device 300 in this embodiment may include not only a terminal device used by the user, but also a server device on the network.

The mediator 400 provides a script format 601. In this case, the mediator 400 buries the authentication information in the script format 601. Meanwhile, the publisher 500 develops an association operation script 603 according to the script format 601, and exhibits the association operation script 603 at the marketplace 200. In this case, the association operation script 603 is developed based on cooperation with a device API 605. When the publisher 500 exhibits the association operation script 603 at the marketplace 200, it may be necessary for the publisher 500 to perform registration in the mediator 400. However, this registration may be omitted by associating the authentication information of the association operation script 607 with a report provided to the mediator 400 when the association operation script is used, as will be described below.

A user 611 obtains the association operation script 603 from the marketplace 200 and uses the association operation script 603 as the association operation script 607 of the electronic device 100. In the illustrated example, the electronic device 100 perform an association operation with the service provider 300 as the association operation script 607 cooperates with the device API 605, and provides service to the user 611. In this case, the electronic device 100 associates a log related to the association operation with the authentication information of the association operation script 607 and transmits the log to the mediator 400 as a report. Accordingly, the mediator 400 can recognize that the association operation using the association operation script developed according to the script format provided to the publisher 500 has been executed, for example, to charge the publisher 500 or distribute a value obtained by charging the user to the publisher 500.

Figure 10:
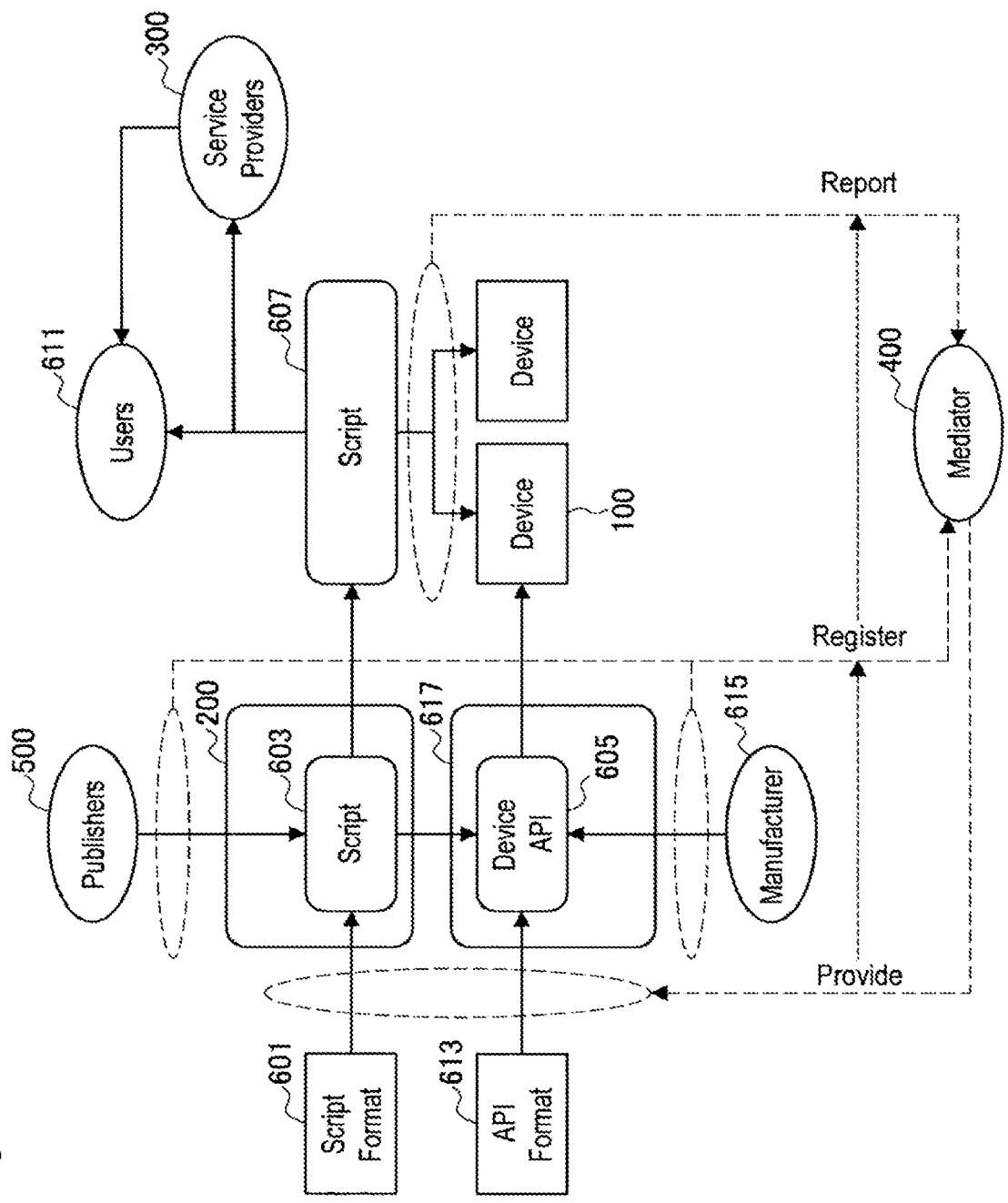
FIG. 10 is a diagram illustrating a second implementation example in one embodiment of this disclosure.

FIG. 10 is a diagram illustrating a second implementation example in one embodiment of this disclosure. In this example, a difference between the first implementation example and the second implementation example is that an API format 613 is also provided to the device API 605. The API format 613 is provided to a manufacturer 615, which then incorporates the device API 605 at the time of manufacture of the electronic device 100. A marketplace 617 is provided for the publisher 500 to obtain the device API 605 incorporated in the electronic device 100. The manufacturer 615 adds authentication information to the device API 605 of the device exhibited at the marketplace 617 and registers this authentication information in the mediator 400. It is possible to trace that the association operation using the device API 605 of the device exhibited by the manufacturer 615 has been executed by associating the authentication information of the device API 605 as well as the authentication information of the association operation script 607 with the report provided to the mediator 400 at the time at which the association operation script is used.

The user 611 obtains the association operation script 603 from the marketplace 200 and uses the association operation script 603 as an association operation script 607 of the electronic device 100. In the illustrated example, the electronic device 100 performs an association operation with the service provider 300 as the association operation script 607 and the device API 605 cooperate with each other, and provides service to the user 611. In this case, the electronic device 100 associates a log related to the association operation with the authentication information of the association operation script 607 and the authentication information of the device API 605 and transmits the log to the mediator 400 as a report. Accordingly, the mediator 400 can recognize the association operation using the association operation script 607 developed according to the script format provided to the publisher 500 and the device API 605 of the electronic device 100 manufactured by the manufacturer 615, for example, to charge the publisher 500 or distribute the value obtained by charging the user to the publisher 500 or the manufacturer 615.

For example, when the device API 605 is not accompanied by the authentication information, it is difficult to trace that the association operation using the device API 605 of the electronic device 100 has been executed. Therefore, even when the electronic device 100 has been used for the association operation, it is difficult to distribute the value of the service provided through the association operation to the manufacturer 615. However, in the example described above, it is possible to trace the execution of the association operation and distribute the value to the manufacturer 615 when the association operation has been executed, by realizing the functionality of the electronic device 100 using the device API 605 and also causing the device API 605 to be accompanied by the authentication information.

(4. Hardware Configuration)

Figure 11:
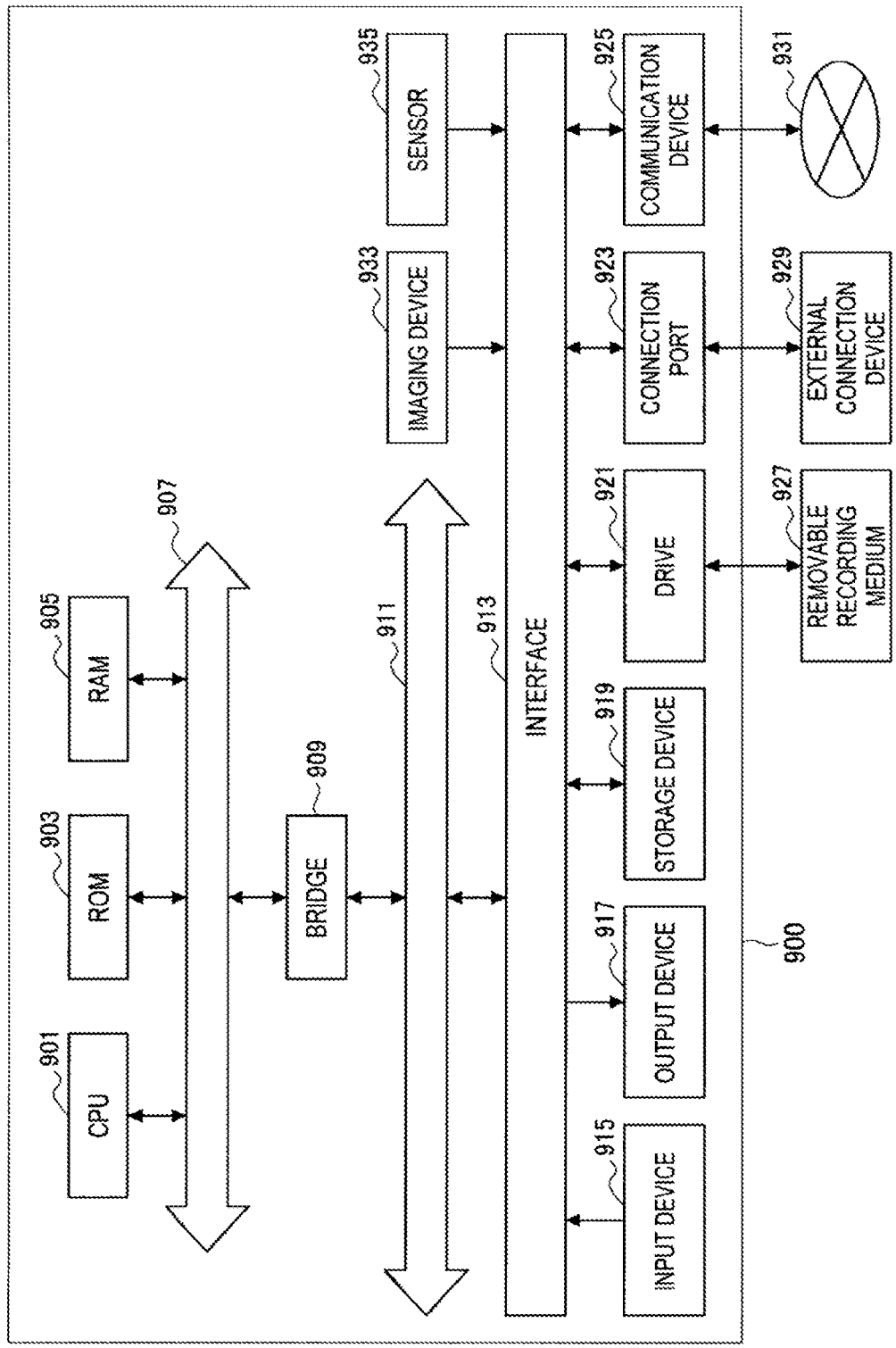
FIG. 11 is a block diagram illustrating a hardware configuration of an information processing device according to an embodiment of this disclosure.

Next, a hardware configuration of an information processing device according to the embodiment of this disclosure will be described with reference to FIG. 11. FIG. 11 is a block diagram illustrating a hardware configuration of the information processing device according to the embodiment of this disclosure. The illustrated information processing device 900, for example, may realize the electronic device 100, the script server 200, the other electronic device 300, or the management server 400 in the embodiment described above.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(5. Supplemental Remarks)

Embodiments of the present disclosure encompass an information processing apparatus (an electronic device or a server) and system as described in the foregoing, an information processing method executed by an information processing apparatus or system, a program for causing an information processing apparatus to function, and a non-transitory computer readable medium storing such a program, for example.

It should be understood by those skilled in the art that various modifications, combinations, sub-combinations and alterations may occur depending on design requirements and other factors insofar as they are within the scope of the appended claims or the equivalents thereof.

Example embodiments include (1) An information processing device comprising:
an interface configured to receive authentication information from an electronic device; and
circuitry configured to
identify an execution range of an association operation program executed by the electronic device based on the authentication information, the execution range being indicative of an authentication of an association between the electronic device and another electronic device.

(2) The information processing apparatus of (1), wherein
the execution range is less than a predetermined range if the authentication information does not match the stored authentication information, and
the execution range is the predetermined range if the authentication information matches the stored authentication information.

(3) The information processing apparatus of (2), wherein the circuitry is configured to transmit an indication of the execution range to the electronic device.

(4) The information processing apparatus of (1), wherein the circuitry is configured to identify from the authentication information from the electronic device a script format that indicates the association between the association operation program and the authentication information from the electronic device.

(5) The information processing apparatus of (1), wherein the authentication information received from the electronic device is included with or in the association operation program.

(6) The information processing apparatus of (1), wherein the interface also receives a log from the electronic device that is associated with the association operation program at the electronic device.

(7) The information processing apparatus of (1), wherein the circuitry is further configured to transmit an additional program to the electronic device to end the association operation program.

(8) The information processing apparatus of (1), wherein the interface is configured to receive the authentication information, the association operation program, and a device API for the electronic device.

(9) The information processing device of (1), wherein the circuitry is configured to implement a script server that receives the association operation program from a publisher and distributes the association operation program to the electronic device.

(10) The information processing device of (1), wherein the circuitry is configured to send a script format to a publisher so the publisher can develop the association operation script in a format that can subsequently be confirmed by the circuitry.

(11) The information processing device of (1), wherein the association operation program is a script.

(12) The information processing device of (1), wherein the interface also receives a log from the electronic device that includes an indication of the association operation program having been executed by the electronic device.

(13) The information processing device of (1), wherein the association operation program configures the electronic device to realize an association operation between the electronic device and the another electronic device.

(14) The information processing device of (1), wherein the association operation program includes a first part in which permission based on the authentication information is used for execution and a second part in which permission based on the authentication information is not used for execution.

(15) An information processing system comprising:
an information management device including
an interface configured to receive authentication information from an electronic device, and
circuitry configured to
identify an execution range of an association operation program executed by the electronic device based on the authentication information, the execution range being indicative of an authentication of an association between the electronic device and another electronic device; and
an information processing device configured to
receive description information regarding the electronic device and the another electronic device,
communicate with the electronic device and another electronic device and
send the association operation program to the electronic device that configures the electronic device to realize an association operation between the electronic device and the another electronic device.

(16) The system of (15), wherein
a release date of the association operation program is after a release date of at least one of the electronic device and the another electronic device.

(17) The system of (15), wherein
the association operation script is related to a type of device, an API version, and/or model type.

(18) The system of (15), wherein
the information processing device is one of a smartphone, a digital camera and a television.

(19) The system of (15), wherein
the association operation program is a script.

(20) An information processing method comprising:
receiving via an interface authentication information from an electronic device; and
identifying with the circuitry an execution range of an association operation program executed by the electronic device based on the authentication program, the execution range being indicative of an authentication of an association between the electronic device and another electronic device.

(21) The method of (20), further comprising:
transmitting an indication of execution range to the electronic device.

(22) The method of (20), further comprising:
identifying from the authentication information from the electronic device a script format that indicates the association between the association operation program and the authentication information from the electronic device.

(23) The method of (20), wherein
the authentication information received from the electronic device is included in the association operation program.

(24) The method of (20), further comprising:
receiving a log from the electronic device that is associated with the association operation program at the electronic device, the log including an indication of the association operation program having been executed by the electronic device.

(20) A non-transitory computer readable storage device including instructions that when executed by a computer cause the computer to execute an information processing method, the method comprising:
receiving via an interface authentication information from an electronic device; and
identifying with the circuitry an execution range of an association operation program executed by the electronic device based on the authentication information, the execution range being indicative of an authentication of an association between the electronic device and another electronic device.

Additionally, the present technology may also be configured as below.

(1) An electronic device, including:
a control unit which controls the electronic device according to an association operation program for the electronic device and at least one other electronic device to execute an association operation, and at least temporarily stores a log related to the association operation in a storage unit together with first authentication information accompanying the association operation program.

(2) The electronic device according to (1), wherein the control unit determines an execution range of the association operation program based on the first authentication information.

(3) The electronic device according to (2), further including:

a transmission unit which transmits a request including the first authentication information to a first server; and a reception unit which receives a response generated in response to the request and including information indicating the execution range of the association operation program from the first server, wherein the control unit executes the association operation program in a range indicated by information included in the response.

(4) The electronic device according to (2), wherein the association operation program includes a first part in which permission based on the first authentication information is necessary for execution, and a second part in which the permission based on the first authentication information is not necessary for execution, and wherein the control unit executes the second part regardless of the first authentication information.

(5) The electronic device according to any one of (1) to (4), further including a transmission unit which transmits a log related to the association operation to the first server.

(6) The electronic device according to (5), further including a reception unit which receives payment information generated based on the transmitted log from the first server.

(7) The electronic device according to (5) or (6), wherein the transmission unit transmits device identification information of the electronic device to a second server different from the first server over a network, and wherein the electronic device further includes a reception unit which receives an association operation program for the electronic device and the at least one other electronic device from the second server over the network.

(8) The electronic device according to (7), wherein the first authentication information includes a signature given by a manager of the first server.

(9) The electronic device according to any one of (1) to (8), wherein the control unit controls the electronic device by accessing a software interface obtained by abstracting a functionality of the electronic device and executes the association operation according to the association operation program.

(10) The electronic device according to (9), wherein the control unit at least temporarily stores in the storage unit a log related to the association operation in such a manner to be associated with the first authentication information and second authentication information accompanying the software interface.

(11) The electronic device according to (10), further including:

a transmission unit which transmits a request including the first authentication information and the second authentication information to the first server; and a reception unit which receives from the first server a response generated in response to the request and including information indicating an execution range of the association operation program, wherein the control unit executes the association operation program in a range indicated by information included in the response.

(12) The electronic device according to any one of (1) to (11), wherein the at least one other electronic device includes an electronic device used in proximity to the electronic device.

(13) The electronic device according to any one of (1) to (12), wherein the at least one other electronic device includes an electronic device constituting a third server connected to the electronic device over a network.

(14) The electronic device according to any one of (1) to (13), wherein the association operation program is described in a script format.

(15) A server including:

a storage unit in which information indicating association between an association operation program for a first electronic device and at least one second electronic device different from the first electronic device and first authentication information accompanying the association operation program is stored;

a reception unit which receives a log related to an association operation that the first electronic device has executed according to the association operation program from the first electronic device together with the first authentication information; and a collection unit which collects the log based on the first authentication information.

(16) The server according to (15), wherein the reception unit receives, from the first electronic device, a request including the first authentication information accompanying the association operation program stored at least temporarily in the first electronic device, and wherein the server further includes a determination unit which determines an execution range of the association operation program based on the received first authentication information; and a transmission unit which transmits a response including information indicating the execution range to the first electronic device.

(17) The server according to (15) or (16), further including:

a payment processing unit which generates payment information based on the collected log; and a transmission unit which transmits the payment information to the first electronic device or a server different from the server.

(18) The server according to any one of (15) to (17), wherein the first authentication information is stored in such a manner to be associated with a format of the association operation program in the storage unit.

(19) The server according to (18), wherein the association operation program is developed according to the format and provided from a server different from the server to the first electronic device.

(20) The server according to (19), wherein the first authentication information includes a signature given by a manager of the server.

(21) The server according to any one of (15) to (20), wherein the association operation is realized in the first electronic device by a software interface obtained by abstracting a functionality of the first electronic device cooperating with the association operation program.

(22) The server according to (21), wherein the reception unit receives a log related to the association operation from the first electronic device together with the first authentication information, and the second authentication information accompanying the software interface.

(23) The server according to (22),
wherein the reception unit receives from the first electronic device a request including the first authentication information accompanying the association operation program stored at least temporarily in the first electronic device and the second authentication information, and
wherein the server further includes
a determination unit which determines an execution range of the association operation program based on the received first authentication information and the received second authentication information, and
a transmission unit which transmits a response including information indicating the execution range to the first electronic device.

(24) The server according to any one of (15) to (23), wherein the at least one second electronic device includes an electronic device used in proximity to the first electronic device.

(25) The server according to any one of (15) to (24), wherein the at least one second electronic device includes an electronic device constituting a server different from the server connected to the first electronic device over the network.

(26) The server according to any one of (15) to (25), wherein the association operation program is described in a script format.

(27) A method of controlling an electronic device, the method including:
controlling, by a processor, the electronic device according to an association operation program for the electronic device and at least one other electronic device to execute an association operation; and
at least temporarily storing a log related to the association operation in a storage unit together with first authentication information accompanying the association operation program.

(28) An information processing method, including:
storing information indicating association between an association operation program for a first electronic device and at least one second electronic device different from the first electronic device and first authentication information accompanying the association operation program;
receiving a log related to an association operation that the first electronic device has executed according to the association operation program from the first electronic device together with the first authentication information; and
collecting, by a processor, the log based on the first authentication information.

(29) A non-transitory computer-readable recording medium having a program recorded therein for causing a processor included in an electronic device to realize functionalities of:
controlling the electronic device according to an association operation program for the electronic device and at least one other electronic device to execute an association operation; and
at least temporarily storing a log related to the association operation in a storage unit together with first authentication information accompanying the association operation program.

(30) A non-transitory computer-readable recording medium having a program recorded therein for causing a processor included in one or a plurality of information processing devices constituting a server to realize functionalities of:
storing information indicating association between an association operation program for a first electronic device and at least one second electronic device different from the first electronic device and first authentication information accompanying the association operation program;
receiving a log related to an association operation that the first electronic device has executed according to the association operation program from the first electronic device together with the first authentication information; and
collecting the log based on the first authentication information.

REFERENCE SIGNS LIST

10 system
100 electronic device
110 processor
111 control unit
112 transmission unit
113 reception unit
120 communication unit
130 storage unit
200 script server
300 other electronic device
400 management server
410 processor
411 reception unit
412 collection unit
413 determination unit
414 payment processing unit
415 transmission unit
420 communication unit
430 storage unit
500 publisher

The invention claimed is:

1. An information processing device, comprising:
an interface configured to
receive an instruction of an association operation executed by an association operation program in an electronic device from a user; and
store a log information of the association operation executed by the association operation program having been executed by the electronic device between another device; and
circuitry configured to
determine an execution range of the association operation program in the electronic device, the association operation program being a program executed by the electronic device regarding the association operation between the electronic device and the other electronic device within the determined execution range, wherein the execution range is a range of allowed functions that are permitted to be performed,
wherein the association operation program describes an entity executing an operation, a function of an Application Programming Interface (API) to be used, and a parameter set for the API,
wherein the electronic device and the other device are external to the information processing device, and
wherein the association operation program includes a first part in which permission based on the authentication information is necessary for execution, and a second part in which the permission based on the authentication information is not necessary for execution, and
the circuitry is configured to execute the second part regardless of the authentication information.

2. The information processing device of claim 1, wherein the interface is configured to receive authentication information from the electronic device, and the circuitry is configured to determine the execution range based on the authentication information.

3. The information processing device of claim 1, wherein in a case the electronic device executes the association operation according to the association operation program, the electronic device acquires authentication information accompanying the association operation program, and the interface receives the authentication information transmitted from the electronic device.

4. The information processing device of claim 2, wherein the authentication information accompanying the association operation program is common in a case the association operation program has been developed according to a same script format by a publisher.

5. The information processing device of claim 1, wherein the association operation program further describes a combination or an order of functions to be executed.

6. The information processing device of claim 1, wherein the circuitry is configured to distribute the association operation program to the electronic device and the other device in a case the electronic device and the other device are close to each other.

7. The information processing device of claim 1, wherein the circuitry is configured to distribute the association operation program to the electronic device and the other device in a case short distance communication has been executed between the electronic device and the other device.

8. The information processing device of claim 1, wherein the circuitry is configured to distribute the association operation program to the electronic device and the other device in a case an image including a two-dimensional code indicating the other device is captured by a camera of the electronic device.

9. The information processing device of claim 1, wherein the information processor device is a server.

10. The information processing device of claim 1, wherein the information processor device is a script server.

11. The information processing device of claim 1, wherein the association operation program is a script.

12. An information processing method, comprising:
receiving an instruction of an association operation executed by an association operation program in an electronic device from a user;
storing a log information of the association operation executed by the association operation program having been executed by the electronic device between another device; and
determining, using circuitry, an execution range of the association operation program in the electronic device, the association operation program being a program executed by the electronic device regarding the association operation between the electronic device and the other electronic device within the determined execution range, wherein the execution range is a range of allowed functions that are permitted to be performed,
wherein the association operation program describes an entity executing an operation, a function of an Application Programming Interface (API) to be used, and a parameter set for the API,
wherein the circuitry is external to the electronic device and the other device, and
wherein the association operation program includes a first part in which permission based on the authentication information is necessary for execution, and a second part in which the permission based on the authentication information is not necessary for execution, and
the method further comprises executing the second part regardless of the authentication information.

13. The information processing method of claim 12, further comprising:
receiving authentication information from the electronic device; and
determining the execution range based on the authentication information.

14. The information processing method of claim 12, wherein
in a case the electronic device executes the association operation according to the association operation program, the electronic device acquires authentication information accompanying the association operation program, and
the method further comprises receiving the authentication information transmitted from the electronic device.

15. The information processing device of claim 13, wherein
the authentication information accompanying the association operation program is common in a case the association operation program has been developed according to a same script format by a publisher.

16. A non-transitory computer readable medium including instructions that when executed by a computer cause the computer to execute an information processing method, the method comprising:
receiving an instruction of an association operation executed by an association operation program in an electronic device from a user;
storing a log information of the association operation executed by the association operation program having been executed by the electronic device between another device; and
determining an execution range of the association operation program in the electronic device, the association operation program being a program executed by the electronic device regarding the association operation between the electronic device and the other electronic device within the determined execution range, wherein the execution range is a range of allowed functions that are permitted to be performed,
wherein the association operation program describes an entity executing an operation, a function of an Application Programming Interface (API) to be used, and a parameter set for the API,
wherein the electronic device and the other device are external to the computer,
wherein the association operation program includes a first part in which permission based on the authentication information is necessary for execution, and a second part in which the permission based on the authentication information is not necessary for execution, and
the method further comprises executing the second part regardless of the authentication information.

17. The non-transitory computer readable medium of claim 16, the method further comprising:
receiving authentication information from the electronic device; and
determining the execution range based on the authentication information.

18. The non-transitory computer readable medium of claim 17, wherein
the authentication information accompanying the association operation program is common in a case the association operation program has been developed according to a same script format by a publisher.

19. The non-transitory computer readable medium of claim 16, wherein
- in a case the electronic device executes the association operation according to the association operation program, the electronic device acquires authentication information accompanying the association operation program, and
- the method further comprises receiving the authentication information transmitted from the electronic device.

* * * * *